(12) United States Patent
Ring et al.

(10) Patent No.: US 6,390,313 B1
(45) Date of Patent: May 21, 2002

(54) SLACKLESS DRAWBAR ASSEMBLY USING AN IMPROVED BALL AND RACE CONNECTION ASSEMBLY

(75) Inventors: Michael E. Ring, Crown Point, IN (US); David W. Daugherty, Jr., Plainfield, IL (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/153,917

(22) Filed: Sep. 16, 1998

(51) Int. Cl.[7] .............................................. B61G 9/00
(52) U.S. Cl. ...................................... 213/62 R; 213/50
(58) Field of Search .............................. 213/50, 60, 61, 213/21, 62 R, 62 A, 74; 384/206, 208, 213, 911, 908, 909; 403/122, 128, 135

(56) References Cited

U.S. PATENT DOCUMENTS

| | | | | |
|---|---|---|---|---|
| 4,531,648 A | * | 7/1985 | Paton ........................... | 213/50 |
| 5,042,393 A | * | 8/1991 | Kanjo et al. .................... | 105/3 |
| 5,407,508 A | * | 4/1995 | Harris et al. .................. | 156/173 |
| 5,544,767 A | * | 8/1996 | Daugherty .................. | 213/62 R |
| 5,558,238 A | * | 9/1996 | Daugherty .................... | 213/50 |
| 6,024,233 A | * | 2/2000 | Natschke et al. ............. | 213/50 |

* cited by examiner

Primary Examiner—Mark T. Le
(74) Attorney, Agent, or Firm—James Ray & Associates

(57) ABSTRACT

An improved ball and race connection assembly for use in connecting together adjacently disposed ends of railway vehicles is provided. This ball and race connection assembly is particularly useful as a connection member in slackless type drawbar assemblies. The improved ball and race connection assembly includes a race member which is formed from a polymeric and/or composite material, specifically a resin impregnated filament wound material which is wound on a polytetrafluoroethylene/polyester mesh sleeve and cured. The use of these materials enables the race member to have sufficient strength and to be self-lubricating, thus eliminating the costs of providing a lubricating material at the ball and race interface, as is necessary when using a metal race, as well as reducing the amount of friction at this interface resulting in lower L/V ratios. Also, the filament wound race member is light-weight, resulting in an overall weight reduction of the railway vehicle connection assembly, easier to manufacture than currently used metal race members, and has excellent corrosion resistance.

12 Claims, 3 Drawing Sheets

SLACKLESS DRAWBAR ASSEMBLY USING AN IMPROVED BALL AND RACE CONNECTION ASSEMBLY

FIELD OF THE INVENTION

The present invention relates, in general, to slackless type drawbar assemblies which are used in the railway industry to couple together the adjacently disposed ends of a pair of railway type freight cars in a substantially semi-permanent fashion and, more particularly, this invention relates to slackless type drawbar assemblies using a ball and race assembly and still, more particularly, the present invention relates to slackless type drawbar assemblies using an improved ball and race assembly which requires less maintenance, results in lower L/V ratios and allows for an overall reduction in weight of the drawbar assembly.

BACKGROUND OF THE INVENTION

Slackless type drawbar assemblies have been well known in the railroad industry for several years as a means to connect together the adjacently disposed ends of a pair of railway freight cars in a substantially semi-permanent fashion, prior to the development of the present invention.

In other words, these railway freight cars do not require frequent separation during service. Normally they will only be separated during a required repair and/or routine maintenance being performed on one or more of them.

These particular railway cars are normally of the type used in what is most commonly referred to, in the railroad industry, as dedicated service. Railway freight cars of such dedicated service type will at least include: those cars which are normally utilized to haul coal, coke, and/or various other types of raw minerals; automotive type transport carriers; cars which are utilized in the transporting of various types of building materials and tank cars which are used to transport various types of liquid products.

Examples of some other raw minerals transported in these dedicated service railway freight cars include: various ores, cement and stone. The various types of liquids transported by such dedicated service railway tank cars will at least include a number of different chemicals. Building materials transported in this manner include: lumber, dry wall, plywood, paneling, etc.

A typical slackless type drawbar assembly using a ball and race connection assembly comprises the following elements: a car connection member engageable with a railway vehicle, a spherical member securable with the car connection member, a male connection member having a curved butt end and an aperture which is disposed around the spherical member secured with the car connection member, a race assembly secured within the aperture of the male connection member and disposed between the spherical member and such aperture, and a drawbar connected to such male connection member.

The outer surface of the spherical shaped member, or ball member, has a sufficiently smooth surface. Currently used ball member surfaces can be electroless nickel plated, chrome plated, or the like to improve the corrosion resistance of the ball member. The race assembly of such currently used slackless type drawbar assemblies, comprises a metal member having a machined surface. This race assembly is secured within the aperture of the male connection member and surrounds a portion of the ball member so that the ball can rotate within the race assembly and aperture and the adjacently disposed freight cars can obtain the requisite amount of angling movements and readily maneuver with respect to each other during their operation on a track structure.

In order to ensure unrestricted movement of the ball member within the race member, care must be taken to ensure that the contacting surfaces are machined to a requisite smoothness. Additionally, adequate lubrication must be provided between the ball member surface and the inner surface of the race member. Any well known techniques of applying lubricating materials between rotating surfaces may be used. One known technique for obtaining this lubrication is to provide a substantially solid type lubricating liner member, such as manufactured by Kahr Bearing Co. and marketed by them under the trade name "KARLON", disposed between the outer surface of the spherical shaped member, or ball member, and the inner surface of the race assembly.

Although many lubricating techniques are well known in the art, it is still difficult to maintain a reduced amount of friction between rotating metal to metal surfaces. Additionally, machining of both the ball member and the race member to sufficient smoothness and continuously providing adequate lubrication between the ball and race surfaces can be costly and time consuming.

The railway industry is continuously seeking ways to cut costs whether these cuts be in the cost of materials, labor manufacturing costs, and/or in maintenance costs. Another way to cut costs is to reduce the weight of the freight cars and the components for connecting the cars together. This reduction in weight allows for a reduction in the amount of energy or fuel used to pull the train which ultimately results in higher payloads. Although higher payloads are the ultimate goal of manufacturers, a high level of safety must be maintained.

One way to measure the safety of the railway vehicle is through what is known as an L/V ratio which is the lateral force over the vertical force of the vehicle. An acceptable L/V ratio limit as set by the Mechanical Committee of the Standard Coupler Manufacturers (MCSCM) is 0.82 and the recommended L/V ratio limit is less than or equal to 0.74. As manufacturers reduce the weight of the cars and/or the loads carried by these cars, care must be taken to ensure that the L/V ratio is not exceeded. If the L/V ratio exceeds the acceptable limit, the lateral force on the car(s) during turning can exceed the vertical force of the car's weight on the wheels thus causing the wheels of the car(s) to lift off of the track and the train to derail.

One of the ways in which an L/V ratio can be reduced is by reducing the amount of friction in the joint between the male and female connection members of the drawbar assemblies.

SUMMARY OF THE INVENTION

It is an object of the present invention to provide a ball and race connection assembly for use in joining together adjacently disposed railway vehicles.

It is another object of the present invention to provide a ball and race connection assembly for use in slackless type drawbar assemblies for joining together in a substantially semi-permanent fashion, adjacently disposed end of a pair of railway cars.

It is a further object of the present invention to provide a ball and race connection assembly which is substantially maintenance free in that the need for providing lubricating material between the ball member and inner surface of the race assembly is eliminated, thus providing an economically desirable alternative to ball and race assemblies currently in use.

It is a still further object of the present invention to provide a ball and race connection assembly which requires less material cost to manufacture and eliminates the time consuming task of machining two separate surfaces, particularly the ball surface and the inner race surface, to a sufficient smoothness to ensure adequate rotation of the ball within the race member so that the adjacently disposed railway cars can readily maneuver with respect to each other during operation.

It is yet a further object of the present invention to provide a ball and race connection assembly which has a reduced weight so that the energy or fuel required to pull the train is reduced, ultimately resulting in a greater payload.

It is still yet a further object of the present invention to provide a ball and race connection assembly which has a high degree of conformity between the race surface and the ball surface, has a reduced maintenance cost, is self-lubricating, corrosion resistant, and will not seize or gall onto the ball member under extreme wear conditions.

It is an additional object of the present invention to provide a slackless type drawbar assembly using a ball and race connection assembly which reduces the amount of friction between the ball and race assembly to achieve lower L/V ratios for increased safety of the railway vehicle. This reduced amount of friction also allows for a reduction in the amount of wheel flange and rail wear which, in turn, reduces the chances for derailment. Furthermore, a reduction in the amount of friction applied against the wheel flange and rail wheel reduces the amount of energy applied thereto, ultimately reducing the amount of fuel required to pull the railway vehicle.

It is another object of the present invention to provide a ball and race connection assembly which may be retrofitted into currently used drawbar assemblies in order to obtain any and/or all of the advantages, as enumerated above, in an economical manner.

Briefly, and in accordance with the forgoing objects, the invention comprises a slackless type drawbar assembly using a ball and race connection assembly for connecting together, in a substantially semi-permanent fashion, adjacently disposed ends of a pair of railway cars. The slackless type drawbar assembly includes a car connection member engageable in one end of a center sill portion which is secured to a bottom portion of a car body member of a first railway car. A pair of shaft or lug members are provided which are engageable with the car connection member. A spherical shaped member or ball is securable with this pair of shaft members such as by a pair of horizontally disposed extension members extending outwardly from axially opposed outer surfaces of the spherical shaped member.

A male connection member having a first end and a second end is provided. An aperture is formed through a predetermined portion of the male connection member adjacent the first end thereof. This aperture is capable of being disposed around at least a portion of the spherical member or ball. Means are attached to the second end of the male connection member which are capable of connecting the male connection member with an adjacently disposed end of a second railway car.

A race assembly having an inner and outer surface is provided. The race assembly is secured along its outer surface within the aperture of the male connection member. The inner surface of the race assembly is disposed around at least a portion of the spherical member or ball such that the spherical member or ball can rotate within this race assembly while maintaining a connection between the male connection member and the car connection member. This race member is formed from a polymeric or composite material such as from a resin impregnated filament wound material which is wound on a sleeve of polymeric material and cured. Means are attached to the second end of the male connection member which are capable of connecting together an end of said first railway car with an adjacently disposed end of a second railway car. This means could include a drawbar arrangement having a second male/female, ball and race connection assembly similar to the one described above.

The use of a polymeric or composite race assembly of the invention has significant advantages over currently used metal race members in the area of materials cost, corrosion resistance, manufacturing labor, maintenance costs, weight, energy consumption, and reduced friction in the ball/race joint, resulting in lower L/V ratios.

Although a number of specific objects and advantages of the present invention have been described in some detail above, various other objects and advantages of the slackless type drawbar assembly incorporating a ball and race connection assembly of the invention will become much more readily apparent to those persons who are skilled in the railway car coupling art from the following more detailed description of the invention, particularly, when such description is taken in conjunction with both the attached drawing Figures and with the appended claims.

BRIEF DESCRIPTION OF THE INVENTION

DETAILED DESCRIPTION OF THE INVENTION

Figure 1:
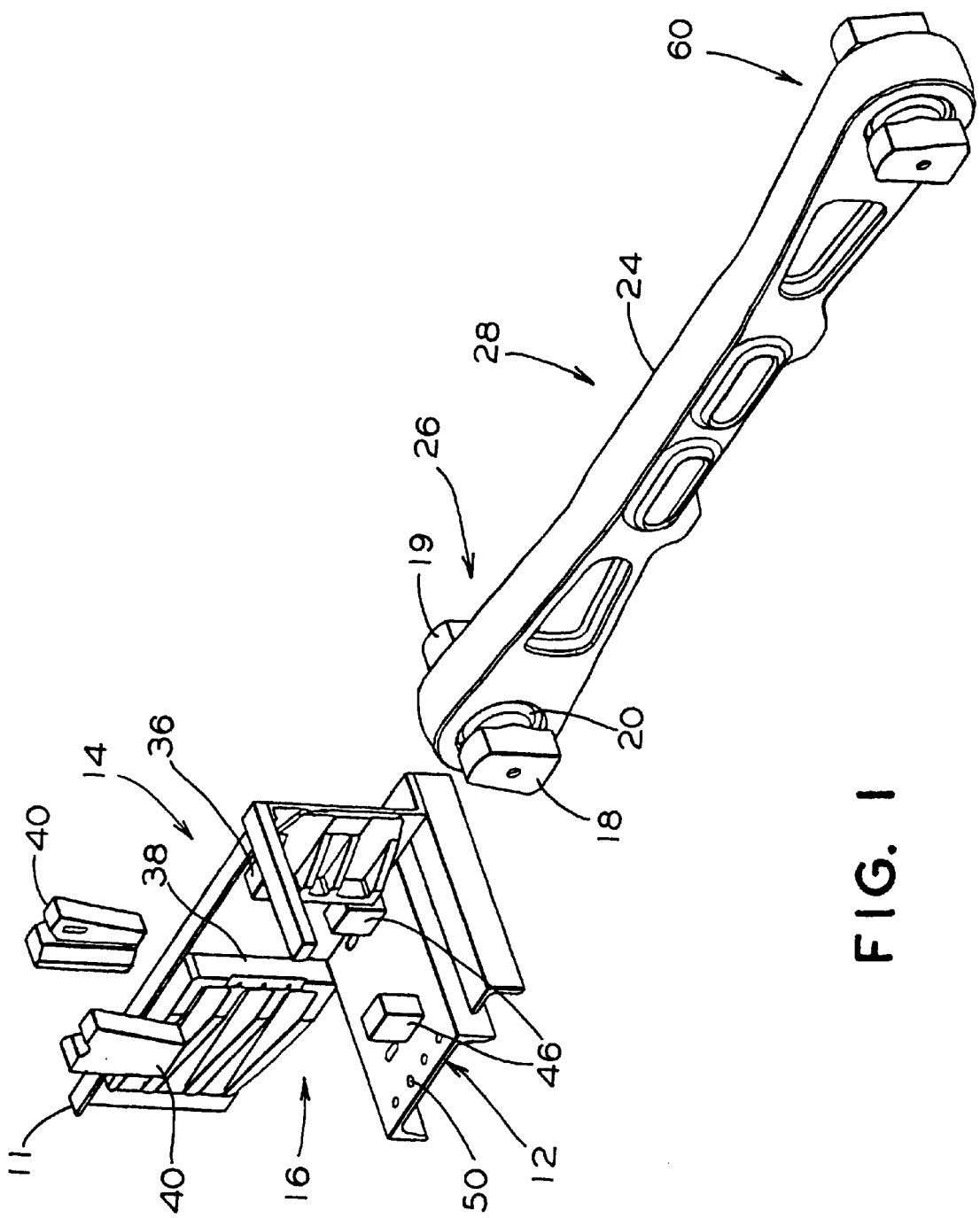
FIG. 1 is an expanded view of a slackless type drawbar assembly using the ball and race connection assembly, according to a presently preferred embodiment of the present invention, prior to insertion of the male connection member of the drawbar assembly into the female connection member.

Prior to proceeding to the more detailed description of the various embodiments of the instant invention, it should be pointed out that, for the sake of clarity, identical components which have identical functions have been identified with identical reference numerals throughout the several views that have been illustrated in the drawings.

Figure 2:
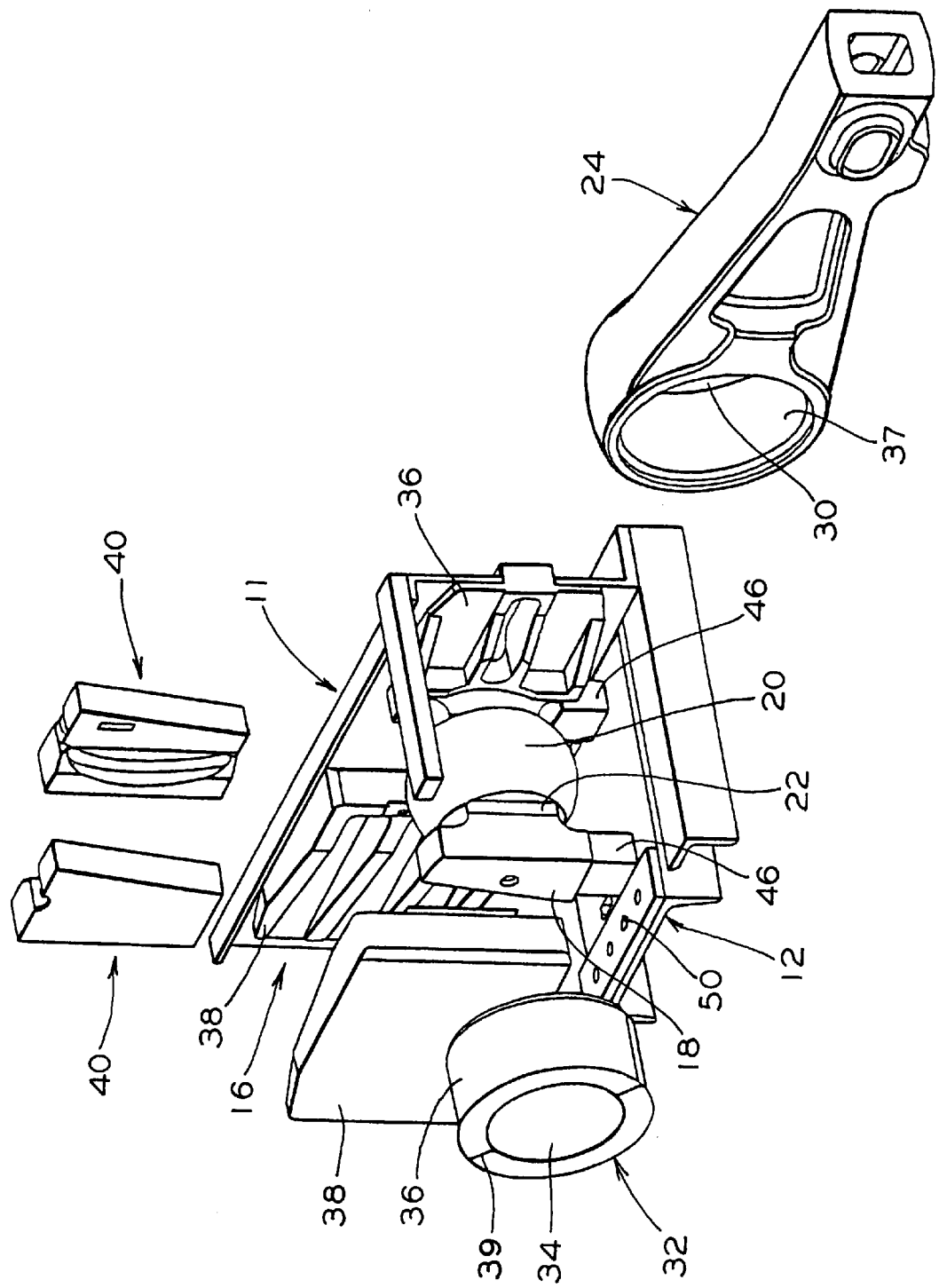
FIG. 2 is also an expanded view of a slackless type drawbar assembly using the ball and race connection assembly of the present invention showing the ball attached within the female connection member and the race separated from the male connection member prior to assembly.
Figure 3:
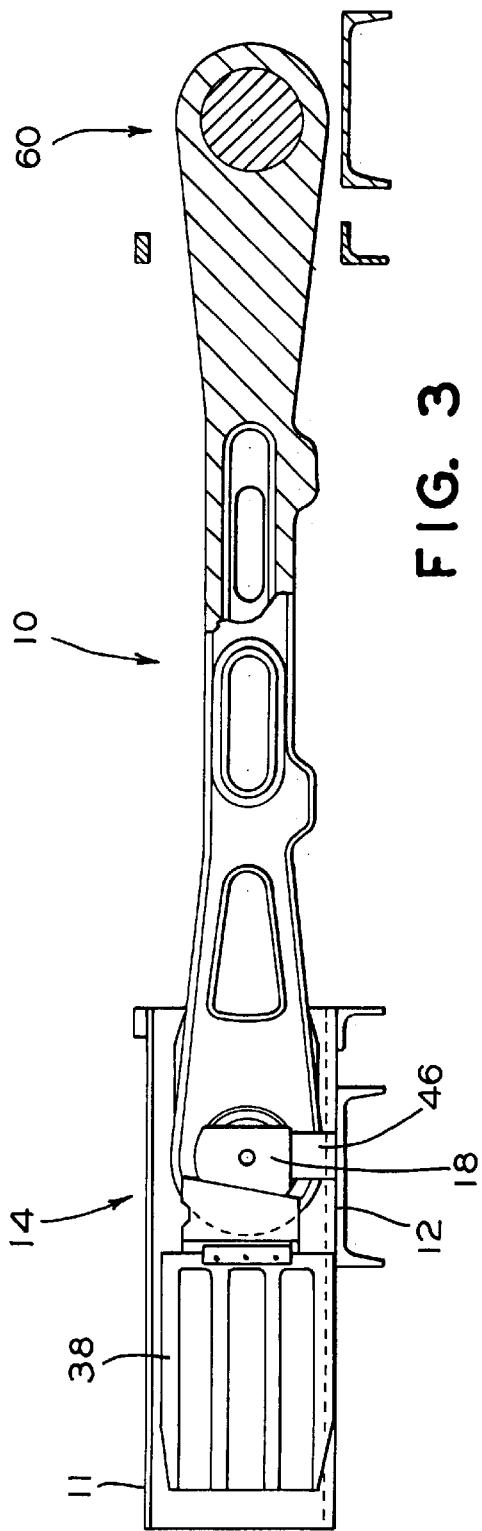
FIG. 3 is a side elevation view of a slackless type drawbar assembly using the ball and race connection assembly of the present invention with the male connection member of the drawbar assembly attached within the female connection member.
Figure 4:
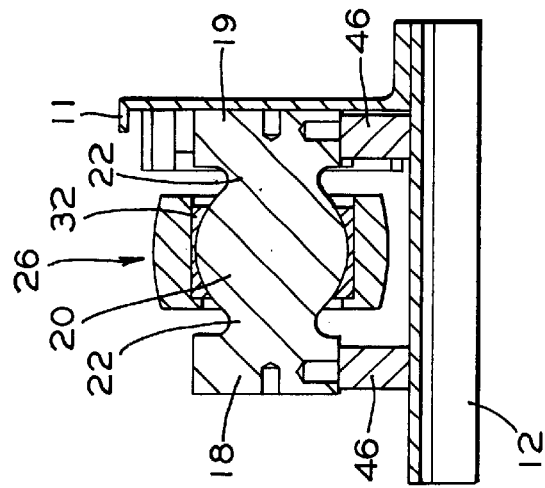
FIG. 4 is an enlarged cross-sectional view taken along line X—X of FIG. 3 illustrating the ball/race/aperture arrangement.

Now reference is made, more particularly, to the drawing FIGS. 1–4. Illustrated therein are the essential components of a slackless drawbar assembly, generally designated as 10, used to connect together in a substantially semi-permanent fashion adjacently disposed ends of a pair of railway cars (not shown).

The slackless drawbar assembly 10 includes a car connection member, generally designated as 14, which is engageable via a carrier plate 12 in one end of a center sill member 11. The carrier plate 12 can be secured with such center sill member 11 by any well known means, such as, for example with a bolt and lock nut assembly. The center sill member 11 is secured to a bottom portion of a car body member (not shown) of a railway car (not shown). The car connection member 14 generally includes a pair of front and a pair of rear draft stops 36, 38, locking wedges 40, a pair of shaft members 18, 19 and shaft member supports 46. The locking wedges 40 may be separate members or may be a single machined or cast piece wherein the locking wedges are connected by a bridge member (not shown).

Filler blocks (not shown) may be included between the rear draft stops 38 and the locking wedges 40 to retrofit some of the longer, older drawbar systems to ball and race assembly systems. Filler blocks may also be used in standard coupling systems. A spherical shaped member or ball 20 is secured to the shaft members 18, 19 via horizontally disposed extension members 22. These shaft members 18, 19 are securable with the car connection member 14 through the shaft member supports 46.

A male connection member, generally designated as 24, having a first end, generally designated as 26, and a second end, generally designated as 28, is provided. An aperture 30 is formed through a predetermined portion of the male connection member 24 closely adjacent the first end 26 thereof. This aperture 30 is capable of being disposed around at least a portion of such spherical member 20.

A race assembly 32 having an inner surface 34 and an outer surface 36 is provided. The race assembly 32 is secured along its outer surface 36 to an inner surface 37 of the aperture 30 of the male connection member 24. The inner surface 34 of the race assembly 32 is disposed around at least a portion of the spherical member 20 such that the spherical member 20 can rotate within this race assembly 32 while maintaining a connection between the male connection member 28 and the car connection member 14.

An example of one type of race member 32 which may be used, in the present invention, is presently available from the Rexnord Corporation and is marketed by them under the trademark Duralon®. This race member 32 is make by the process of providing a tooling ball on a shaft. Placing a sleeve of Teflon®/Dacron® yarn mesh material over the ball and heat shrinking it thereon. Teflon® also known as PTFE and/or polytetrafluoroethylene, and Dacron®, also known as polyester, are registered trademarks of E.I. Du Pont De Nemours. Fibers, such as glass fibers are run through a resin bath, such as an epoxy resin bath, and subsequently wound on the 15:2 sleeve. The Dacron® yarns enables the resin impregnated fibers to bond to the sleeve. The resin in the fibers is then cured and the product is machined to the desired size to form the race member 32. After machining, the race member 32 is removed from the tooling ball by any well known technique. One technique of removing the race member is by cutting it in half. This cut can be seen in FIG. 2, element 39.

Other polymeric materials, well known in the art, may be used to form the race member 32 as long as they will provide sufficient strength and lubrication to the race member 32.

The male connection member 24 includes a means 60 attached thereto for connecting together an end of a second railway car (not shown) with an adjacently disposed end of the first railway car (not shown). This means 60 can be in the form of a drawbar assembly including a second male connection member, similar to that described above, which is capable of being fitted with a corresponding car connection member, also similar to that described above, on the second railway car or a rotary type connection assembly (not shown).

It has been found that the use of this resin impregnated filament wound polymeric race member 32 has significant advantages over currently used metal race members. These advantages include a reduction in the cost of manufacturing labor because the use of the Teflon®/Dacron® sleeve, which will form the inner surface of the race member, eliminates the need for manufacturing and machining the inner race surface to sufficient smoothness in order to reduce the amount of rotational friction between the inner race surface and the outer ball surface.

Another advantage to the present invention can be seen in the area of maintenance, as well as materials cost, as the ball/race connection assembly is self lubricating, thus the need for buying, applying, and inspecting the amount of lubrication between the ball/race assembly is eliminated.

Additionally, this polymeric and/or composite race member 32 has excellent corrosion resistance, thus the number of inspection cycles and replacement of the race member 32 is reduced. Another significant advantage is that the weight of the filament wound polymeric race member 32 is significantly less than that of the currently used metal member. Any reduction in weight of a railway component is desirable in that it reduces the amount of energy or fuel necessary to pull the train, ultimately resulting in higher payloads.

A final and highly significant advantage of the present invention's use of a filament wound race member 32 in a ball and race connection assembly for a slackless drawbar assembly is that the friction in the ball/race joint is reduced, resulting in lower L/V ratios which decreases the chances of derailment or jackknifing of the train.

The present invention is not limited to use in the manufacture of new slackless drawbar assemblies. The ball and race connection assembly of the present invention may be retrofitted onto existing drawbar systems by replacing the currently used metal race assemblies with a filament wound polymeric race member. Additionally, this ball and race connection assembly may be utilized in articulated coupler arrangements for railway vehicles.

The present invention provides an economically desirable alternative to currently used ball and race connection assemblies while also increasing the safety of the railway vehicle by reducing the chance of a derailment and/or a jackknifing of the railway vehicle.

Thus, the present invention has been described in such full, clear, concise and exact terms as to enable any person skilled in the art to which it pertains to make and use the same. It will be understood that variations, modifications, equivalents, and substitutions for components of the specifically described embodiments of the invention may be made by those skilled in the art without departing from the spirit and scope of the invention as set forth in the appended claims.

We claim:

1. A slackless drawbar assembly for connecting together, in a substantially semi-permanent fashion, adjacently disposed ends of a pair of railway cars in a railway vehicle, said slackless drawbar assembly comprising:

(a) a car connection member engageable in one end of a center sill portion which is secured to a bottom portion of a car body member of a first railway car;

(b) a pair of shaft members engageable with said car connection member;

(c) a spherical member securable with said pair of shaft members;

(d) a male connection member having a first end and a second end;

(e) an aperture formed through a predetermined portion of said male connection member adjacent said first end thereof, said aperture capable of being disposed around at least a portion of said spherical member;

(f) a race assembly formed from at least one of a polymeric and composite material, said race assembly having an inner and outer surface, said inner surface of said race assembly being disposed around at least a portion of said spherical member for engagement therewith and said outer surface of said race assembly being secured within said aperture of said male connection member to join said male connection member with said connection member, said race assembly causing a reduction in L/V ratio when said race assembly is positioned in the place of a metal race assembly of an existing railway vehicle; and (g) means attached to said second end of said male connection member for connecting together an end of a second railway car with an adjacently disposed end of said first railway car.

2. A slackless drawbar assembly as recited in claim 1 wherein said race assembly is formed from a resin impregnated filament wound material.

3. A slackless drawbar assembly as recited in claim 1 wherein said race assembly formed from at least one of a polymeric and composite material results in an L/V ratio of less than or equal to 0.74.

4. A slackless drawbar assembly as recited in claim 1 wherein said car connection member includes a pair of front draft stops and a pair of rear draft stops.

5. A slackless drawbar assembly as recited in claim 4 wherein a pair of locking wedge members is positioned adjacent said pair of rear draft stops and secured to said car connection member.

6. A slackless drawbar assembly as recited in claim 4 wherein said pair of shaft members are positioned adjacent said pair of front draft stops and secured to said car connection member.

7. A slackless drawbar assembly as recited in claim 5 wherein said pair of shaft members are positioned between said pair of front draft stops and said pair of locking wedge members, said pair of shaft members being secured to said car connection member.

8. A slackless drawbar assembly as recited in claim 5 wherein positions between said pair of rear draft stops and said pair of locking wedge members are configured to receive a pair of filler block members.

9. A slackless drawbar assembly as recited in claim 1 wherein said spherical member includes a pair of horizontally disposed extension members for securing said spherical member with said pair of shaft members.

10. A slackless drawbar assembly as recited in claim 1 wherein said pair of shaft members are engageable with said car connection member via a pair of shaft member supports.

11. A slackless drawbar assembly as recited in claim 1 wherein said means attached to said male connection member comprises a drawbar having a male connection member at an opposite side thereof capable of connecting to an adjacently disposed end of a railway car.

12. A slackless drawbar assembly as recited in claim 11 wherein said male connection member at such opposite side of said drawbar assembly is capable of being connected to a car connection member.

* * * * *